No. 881,805. PATENTED MAR. 10, 1908.
H. D. KLEIN.
FISH BAIT.
APPLICATION FILED MAY 17, 1907.
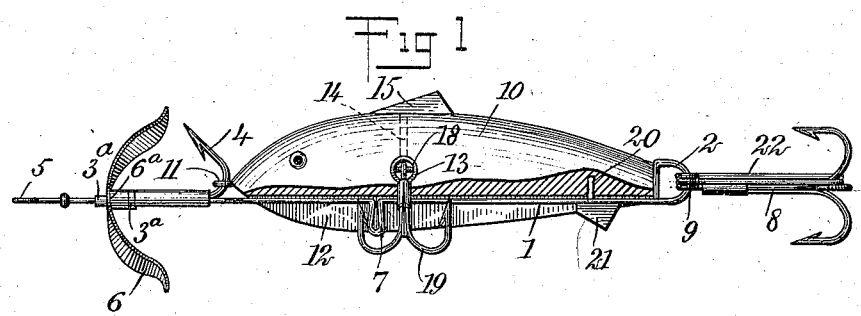
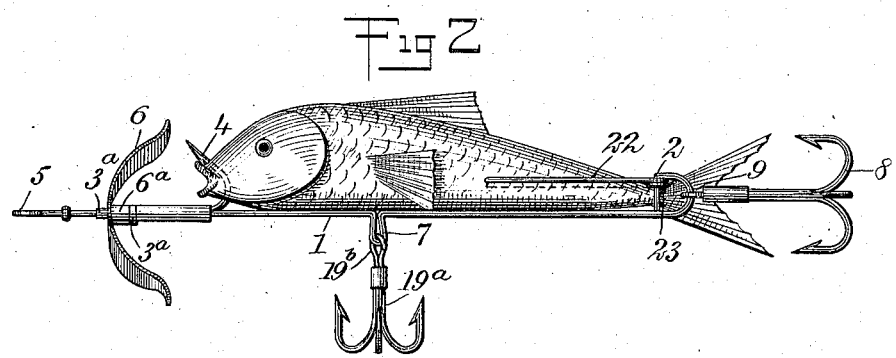
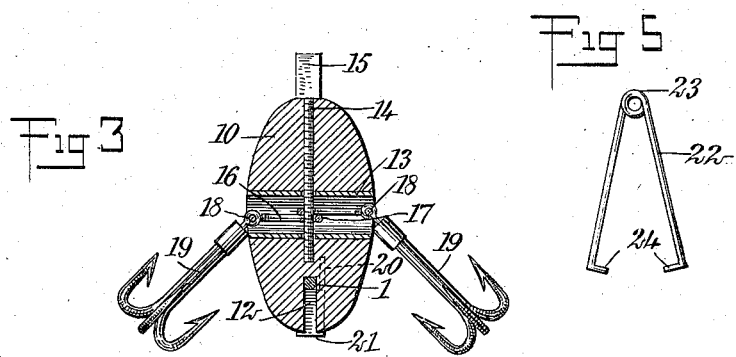
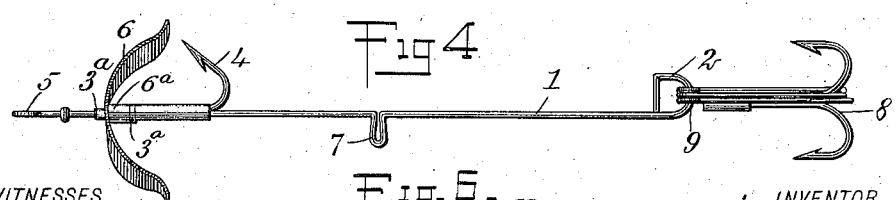
WITNESSES
E. G. Bromley
John K. Bidelspegel
INVENTOR
Henry D. Klein
BY Munn & Co.
ATTORNEYS

UNITED STATES PATENT OFFICE.

HENRY DAVID KLEIN, OF BUTTERNUT, WISCONSIN.

FISH-BAIT.

No. 881,805.  Specification of Letters Patent.  Patented March 10, 1908.

Application filed May 17, 1907. Serial No. 374,287.

*To all whom it may concern:*

Be it known that I, HENRY DAVID KLEIN, a citizen of the United States, and a resident of Butternut, in the county of Ashland and State of Wisconsin, have invented a new and Improved Fish-Bait, of which the following is a full, clear, and exact description.

This invention relates to fish baits, and is particularly useful in connection with devices of this character used for trolling and casting.

The object of the invention is to provide a simple, strong and durable fish bait provided with a plurality of hooks, and a spinner adapted to receive a rotary motion in the water to attract the fish, and which is adapted to be used in connection with an artificial wooden minnow, or live bait such as a minnow, a frog, and the like.

A further object of the invention is to provide a fish bait having hooks secured near the intermediate portion of the bait though held from contact with the same.

The invention consists in the construction and combination of parts to be more fully described hereinafter and particularly set forth in the claims.

Reference is to be had to the accompanying drawings forming a part of this specification, in which similar characters of reference indicate corresponding parts in all the figures, and in which Figure 1 represents a side view of my device showing a wooden minnow attached thereto, with a part broken away; Fig. 2 is a similar view of the device, showing a live bait secured thereto; Fig. 3 is an enlarged cross section of the bait with the wooden minnow in position; Fig. 4 is a side view of the body of my invention; Fig. 5 is a plan view of a detail; and Fig. 6 is a plan view of a further detail.

Before proceeding to a more detailed explanation of my invention it should be understood that it is customary to use artificial minnows for certain forms of fishing, including trolling and casting. In trolling, the bait is drawn slowly through the water at the end of the line. The spinner is given a rotary or twirling motion by the movement of the bait through the water. The spinner is highly polished and its glittering movement attracts the fish to the bait. It is often preferable to use live bait instead of artificial bait, for trolling and other forms of fishing. The artificial minnows usually employed are provided with a plurality of hooks at different portions of the device to insure the hooking of the fish when the latter strikes at the bait. In my device I provide a body having a plurality of hooks to which either an artificial minnow or a live bait may be attached. At the same time, my bait includes means for attaching a plurality of hooks at an intermediate portion of the body of the bait.

Referring more particularly to the drawings, 1 represents an elongated body formed preferably of wire or the like and having at one end an integral loop or eye 2 and at the other a fish hook 4 soldered or otherwise rigidly secured upon the body. The hook 4 is of the usual barb type. An attaching eyelet 5 is rigidly mounted upon the body 1 at the end thereof opposite to the eye 2 and serves for attaching the bait to the fish line. A spinner 6 of the form usually employed in such devices is mounted to rotate freely upon the body 1 by means of a sleeve $6^a$ and rigid stops $3^a$ engage the spinner to hold the same rotatably upon the body. As the bait is drawn through the water the spinner receives a twirling motion and as it is formed of brightly polished metal or other suitable material, it serves excellently for attracting the fish to the bait. Near its middle portion, the body is formed into an offset loop 7 for a purpose which will appear hereinafter.

A triple fish hook 8 of the usual type is loosely mounted by means of an eye 9, at the eye 2 of the body 1. I provide a wooden minnow 10 having at its head end an eye 11, and provided on its under side with a longitudinal groove or recess 12. In using the wooden or artificial minnow 10, the eye 11 is slipped over the hook 4, and the groove 12 is placed in engagement with the body 1, as appears most clearly in Fig. 1. The tail end of the wooden minnow abuts against the eye 2 of the body. The wooden minnow 10 has a transverse opening therethrough, in which is located a tube 13, having a transverse opening through which passes a screw 14, located in a suitable opening in the body of the minnow, and carrying at its upper end an extension 15 representing the upper fin of the minnow.

I provide a shackle 16 formed near its middle portion into a loop 17, and having at its extremities eyes 18 at which are loosely secured triple hooks 19 of the usual type. When the artificial minnow is in position on the body of my invention, the screw 14 passes through the loop 17, holding the shackle in proper position in the tube 13. The arrangement is such that the ends of the shanks of the hooks 19 are held substantially at the outer openings of the tube 13, and by engaging the edges of the openings of the tube, are prevented from coming in contact with the artificial minnow to mar the same, and are held in laterally projecting positions whereby the chances of securing the fish when the bait is struck, are increased.

To assist in securing the artificial bait firmly upon the body I employ a pin 20 having an extended head representing preferably, the ventral fin of a small fish such as is used for live bait. The pin 20 is adapted to be inserted and arranged in a suitable opening at the under side of the artificial minnow with the extension 21 arranged in the slot 12 which is laterally extended at a suitable point to receive the extension. The latter when in position rests against the body 1 and as it is disposed laterally with respect to the pin the same is located at one side of the body when in the opening adapted to receive it, as is shown most clearly in dotted outline in Fig. 3.

In case it is desired to use live bait such as a minnow, in connection with my invention, the artificial minnow together with the triple hooks 19, is removed by withdrawing the screw 20 and unhooking the eye 11 from the hook 4. A triple hook 19a similar to the triple hooks 19 is placed upon the loop 7 by means of a catch 19b. The live minnow is placed upon the body with the hook 4 through its head, and with the tail adjacent to the eye 2 at the end of the body.

A catch 22 having a central loop 23, and having arms with laterally disposed ends 24, is loosely mounted upon the eye 2 of the body. The catch is for the purpose of securing the tail end of the live bait in position, the arms extending along the body of the bait with the laterally disposed extremities forced into the sides of the minnow, as shown most clearly in Fig. 2. In this way the live bait is held securely at the head and tail ends, upon the body of the device, and the triple hook 19a is secured to the body near an intermediate portion of the body of the minnow. When the artificial minnow is used, the catch 22 is turned backward and is located along the shank of the hook 8.

Having thus described my invention, I claim as new and desire to secure by Letters Patent:

1. In a device of the class described, a body having means for securing a live bait upon said body, and a catch carried by said body and adapted removably to engage the live bait and to hold the same in position, said body being adapted to support a removable artificial bait formed to be mounted upon said body.

2. In a device of the class described, a body having a fish hook, said fish hook being adapted to attach a live bait upon said body, and a catch carried by said body and adapted removably to engage the live bait thereby to hold the same in position, said body being adapted to support a removable artificial bait formed to be mounted upon said body.

3. In a device of the class described, in combination, a body having a fish-hook near one end thereof, said fish-hook being adapted to attach a live bait at the head thereof upon said body, a catch carried by said body and adapted removably to engage the live bait and to hold the same in position, said catch having spring arms presenting laterally disposed extremities.

4. In a device of the class described, in combination, a body having a fish-hook near one end thereof, said fish-hook being adapted to attach a live bait at the head thereof upon said body, a catch serving to attach a live bait upon said body, said body having an offset loop near the center, and a removable hook adapted to be supported by said offset loop.

5. In a device of the class described, in combination, a body having a fish-hook near one end thereof, and a removable artificial bait supported by said body, said artificial bait having a groove on the under side thereof, said body engaging said groove and supporting said artificial bait, said fish hook engaging said bait at the head thereof.

6. In a device of the class described, in combination, a body having a fish hook near one end thereof, a removable artificial bait supported by said body and having a groove on the ventral side thereof arranged to receive said body, said fish hook being adapted to engage said artificial bait to hold the same, said body being adapted to serve when said artificial bait is removed, as a support for a live bait, said fish hook being also adapted to engage the live bait.

7. In a device of the class described, in combination, a body having a fish-hook near one end thereof, a catch near the opposite end of said body, a removable artificial bait supported by said body, said artificial bait having a groove on the ventral side thereof engaging said body, said artificial bait being provided with a transverse opening, laterally projecting fish hooks, means in said opening for supporting said laterally projecting fish-hooks, and means for holding said supporting means against lateral movement.

8. In a device of the class described, in combination, a body, an artificial bait adapted to be removably secured upon said body, and a weighted member suitably mounted on the under side of said bait, said member serving to maintain said bait in a normal position while the device is being drawn through the water and simulating in appearance a part of said bait, said body having a fish hook adapted to engage said bait to hold the same.

9. In a device of the class described, in combination, a body, an artificial bait removably attached to said body, said bait having a transverse opening and further openings at an angle therewith, a shackle mounted within said transverse opening, laterally projecting fish-hooks secured to said shackle, and a screw-pin arranged in said further openings of said bait and passing through said transverse opening, said screw-pin having an extension on the upper end thereof, said extension being adapted to act as a dorsal fin to keep the artificial bait in a normal position when the device is being drawn through the water.

10. In a device of the class described, in combination, a body having a fish-hook and adapted removably to carry a live bait, an artificial bait removably mounted upon said body, said artificial bait having a transverse opening and further openings at an angle therewith, a shackle mounted in said opening, laterally projecting fish-hooks secured to said shackle, a screw pin arranged in said further openings of said artificial bait and engaging said shackle, said screw-pin having an extension at the upper end thereof constituting a dorsal fin, and a weighted pin arranged at the under side of said artificial bait and engaging said body, said weighted pin having an extension constituting a ventral fin.

In testimony whereof I have signed my name to this specification in the presence of two subscribing witnesses.

HENRY DAVID KLEIN.

Witnesses:
   NICK STOCKHAUSEN,
   GEORGE DANCKUARDT.